PARTY LINE SUB-STATION

Filed April 19, 1960

INVENTORS
YOKICHI KANO
YUJI TAKEMI
BY SHOICHI KASAHARA
Mitchell & Bechert
ATTORNEYS United States Patent Office 3,155,776 Patented Nov. 3, 1964

3,155,776

PARTY LINE SUB-STATION

Yokichi Kano, Yuji Takemi, and Shoichi Kasahara, Tokyo, Japan, assignors to Nippon Electric Company Limited, Tokyo, Japan, a corporation of Japan Filed Apr. 19, 1960, Ser. No. 23,254
2 Claims. (Cl. 179—32)

This invention relates to a party line telephone system, and more particularly to sub-station circuits in the party line system.

More specifically, this invention is directed to a unique circuit for providing privacy of conversation for the party speaking on the party line.

As is well known, the telephone industry has been, for many years, seeking a solution to the problem of affording secrecy to the talking subscriber on a party line. Although the literature is replete with many suggestions for a solution to this problem, the suggestions have been either too costly, too complicated, or requiring basic changes in the construction of the telephone equipment.

It is a primary object of this invention to provide a novel and unique sub-station circuit which is capable of providing the desired privacy for a talking subscriber. This capability is provided by adding only a simple element to the existing sub-station circuits, requiring no material change in the basic construction of the hand-set.

It is a feature of this invention to provide a circuit element which affords privacy of conversation on a telephone party line, which circuit is inexpensive, requiring the addition of an element which is sub-miniature in size and which may be accommodated in the existing hand-set construction.

In accordance with an aspect of the invention, there is provided a party line telephone system comprising a plurality of sub-stations connected in parallel, the sub-stations being fed by a common supply of voltage of predetermined magnitude. The invention is characterized by connecting in series with the sub-station transistor and receiver a device having two levels of impedance, a normal high level and a low level assumed by the device in response to the voltage of predetermined magnitude, the drop in impedance being accompanied by a decrease in voltage across the device substantially below the predetermined magnitude. A sub-station hand-set hook switch is connected in series with the impedance device, whereby when a hand-set is lifted thereby closing its hook switch, a voltage at least equal to the predetermined magnitude is applied to the impedance device from the common voltage supply. This voltage causes the impedance of the impedance device to drop to the low level, with a corresponding decrease in voltage thereacross, whereby the impedance devices in the other sub-stations remain in the normal high level condition of impedance even if a hand-set is lifted at another party line sub-station. Accordingly, the talking circuits of the other sub-stations are effectively blocked by the impedance device.

Figure 1:
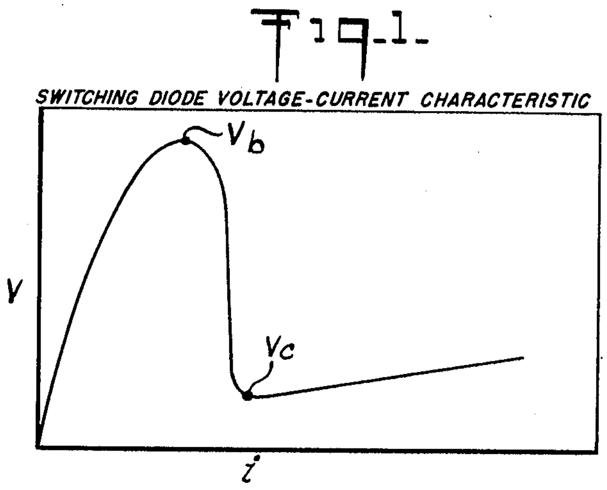
Figure 2:
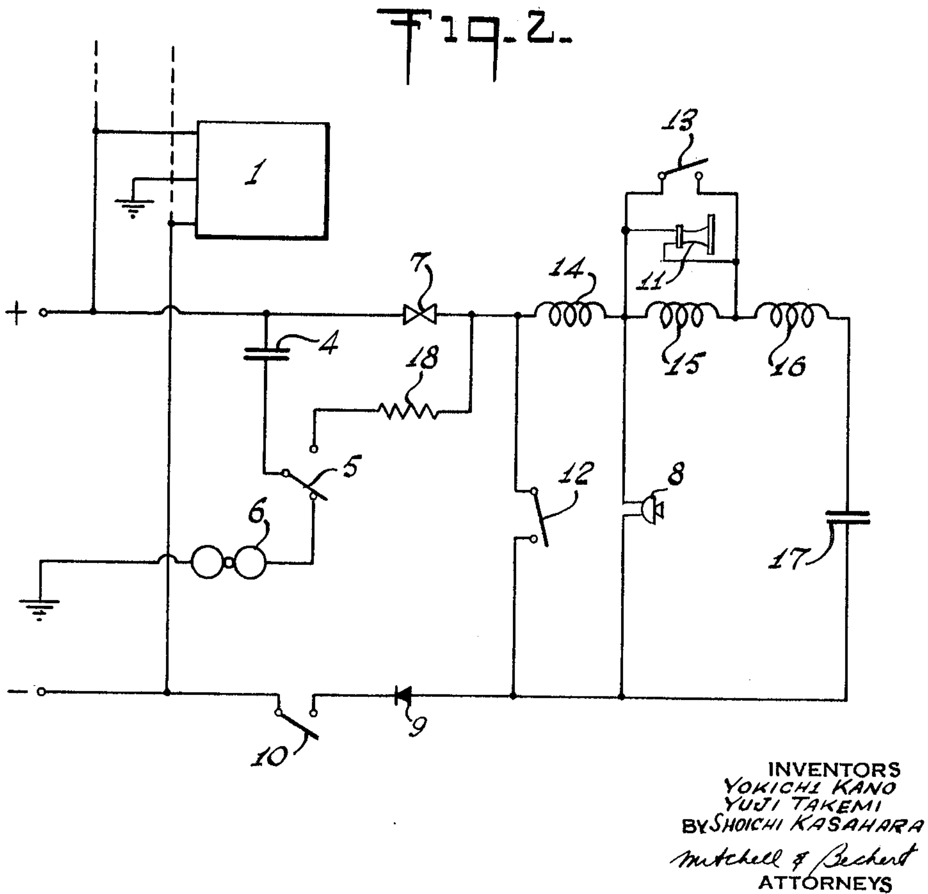

The above-mentioned and other features and objects of this invention and the manner of attaining them will become more apparent and the invention itself will be best understood by reference to the following description of an embodiment of the invention taken in conjunction with the accompanying drawing, wherein:

FIG. 1 is a voltage-current characteristic of the impedance device utilized in the novel sub-station circuits; and FIG. 2 is a partial schematic diagram of a sub-station circuit.

The impedance device utilized in the novel circuit is preferably a three-junction switching diode of the PNPN type. Such switching diodes are now well known and are characterized by a voltage characteristic as illustrated in FIG. 1. The characteristic exhibits a first region where the current varies directly with the voltage. At a predetermined level indicated at $Vb$, the impedance of the diode "breaks down" and the voltage drops abruptly with the impedance to the level $Vc$. The switching diodes may be considered as a device having a high and low level of impedance. The high level of impedance is a normal impedance which the diode exhibits before subjected to the breakdown voltage $Vb$. The low level of impedance is that which the diode exhibits after break-down or approximately at the voltage $Vc$. The switching diode or its equivalent is utilized in each of the sub-station circuits connected in parallel in a party line, as shown in FIG. 2.

One sub-station circuit is shown schematically, a second is shown by block diagram at 1 and others are suggested by the dashed lines connecting the two illustrated sub-stations in parallel.

Each sub-station circuit comprises a ringing circuit and a talking circuit. The ringing circuit includes a source of voltage shown schematically by (+) and (−) symbols, capacitor 4, normally closed contacts 5 of the hand-set hook switch, and bell transformer 6 to ground. The ringing circuit is of a type commonly known as divided ringing.

The talking circuit in the sub-station comprises closed dialing contacts 7, transmitter 8, switching diode 9 and hook switch contact 10 which is closed when the hand-set is lifted. The receiving circuit includes the closed dialing contacts 7, receiver 11, diode 9 and hook switch contact 10.

An off-normal contact 12 is provided across the transmitter 8 and a second off-normal contact 13 is provided acrosss the receiver 11 for shorting out the transmitter and receiver during dialing. The purpose of off-normal contacts is well known in the art. Suffice it to say, that the contacts eliminate the clicking noise in the receiver and improves the shape of the dialing pulses.

The coils 14, 15 and 16 and capacitor 17 are the conventional components constituting an anti-side tone circuit, preventing what is commonly known as howling or ringing in the hand-set.

A spark suppression circuit comprising capacitor 4 and resistor 18 is coupled across the dialing contacts 7. When the hand-set is lifted, the hook switch contact 5 closes the spark suppression circuit, shunting the dialing contacts. The other sub-stations on the party line are, of course, similar to the one just described.

The critical element in the novel circuit is the dual level impedance device or switching diode 9, which is connected in series with the transmitter 8 and the receiver 11. Normally, when the hand-set is in its "rest" position, the hook switch contacts 5 and 10 are in the position indicated, whereby the switching diode 9 is disconnected from the common battery voltage supply.

When a sub-station is called, and the hand-set is lifted, the hook switch contacts 10 and 5 are moved to the opposite positions, thereby closing the spark suppression circuit and the battery supply to the sub-station circuit.

As previously explained, the characteristic of the diode is such that it presents a large impedance until it is subjected to a voltage of such magnitude as to exceed its break-down voltage. The battery supply voltage is the conventional 48 volts D.C. The break-down potential of the switching diode 9 is preferably of the order of 35 to 45 volts. The normal impedance of the diode is of the order of 1 megohm and the potential across the diode after break-down is of the order of 1 volt. As is well known, the line loop impedance is approximately 1000 ohms and, therefore, the normal impedance of the diode 9 is approximately 1000 times greater than the line loop impedance.

Thus, the subscriber who is calling or who is being called, upon lifting his hand-set closes the hook switch contact 10 and thereby causes the battery voltage to be applied across the diode 9, causing the diode to break down. The voltage, across the diode in its low impedance condition is of the order of 1 volt, and since the plurality of sub-stations in the party line are connected in parallel, the relatively low voltage across the diode and the talking circuit would be less than the diode break-down voltage if the hand-set were lifted at any of the other sub-stations. In other words, all of the other sub-stations in the party line are blocked by the normal, high impedance of the switching diode in series with the transmitter and receiver. Thus, the novel circuit provides conversation privacy for each sub-station in the party line.

While the foregoing description sets forth the principles of the invention in connection with specific apparatus it is to be understood that this description is made only by way of example and not as a limitation of the scope of the invention as set forth in the objects thereof and in the accompanying claims.

We claim:

1. A party line telephone system comprising a plurality of sub-stations connected in parallel, a common supply of voltage of predetermined magnitude for applying ringing and talking currents to said plurality of sub-stations; each of said sub-stations including a transmitter and a receiver and an impedance device in series with said transmitter and receiver, said impedance device being characterized by a normally high level of impedance which immediately drops to a low impedance level with a corresponding decrease in voltage across said device substantially below said predetermined magnitude when said device is subjected to said voltage of predetermined magnitude, a sub-station hand-set hook switch in series with each of said impedance devices, whereby when one of said hook switches is closed said voltage of predetermined magnitude is applied to the associated impedance device from said common voltage supply, thereby causing the impedance of said associated impedance device to drop to said low level with a corresponding decrease in voltage thereacross, the impedance devices in the other sub-stations of said party line remaining in the normal high level condition of impedance.

2. The system according to claim 1, wherein said impedance devices comprise semi-conductor switching diodes of the PNPN type.

References Cited in the file of this patent

UNITED STATES PATENTS

| | | |
|---|---|---|
| 2,133,814 | Halligan | Oct. 18, 1938 |
| 2,186,242 | Halligan | Jan. 9, 1940 |
| 2,873,316 | Power | Feb. 10, 1959 |